United States Patent
Sagou et al.

(10) Patent No.: US 8,073,484 B2
(45) Date of Patent: Dec. 6, 2011

(54) MOBILE TERMINAL DEVICE, REMOTE NOTIFICATION METHOD AND RECORDING MEDIUM

(75) Inventors: Yuuichi Sagou, Fussa (JP); Erina Sato, Kawasaki (JP); Yaeko Yonezawa, Hino (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 979 days.

(21) Appl. No.: 12/012,435

(22) Filed: Feb. 1, 2008

(65) Prior Publication Data
US 2008/0214235 A1    Sep. 4, 2008

(30) Foreign Application Priority Data
Mar. 2, 2007 (JP) ................................. 2007-052210

(51) Int. Cl.
*H04M 1/00* (2006.01)
*H04M 3/42* (2006.01)
(52) U.S. Cl. .................... 455/552.1; 455/414.1
(58) Field of Classification Search ............... 455/552.1
See application file for complete search history.

(56) References Cited

U.S. PATENT DOCUMENTS

| | | | |
|---|---|---|---|
| 2005/0136988 A1* | 6/2005 | Villamil et al. | 455/567 |
| 2005/0250444 A1* | 11/2005 | Zinn et al. | 455/41.2 |
| 2005/0250552 A1* | 11/2005 | Eagle et al. | 455/567 |
| 2005/0272441 A1* | 12/2005 | Bates et al. | 455/456.1 |

FOREIGN PATENT DOCUMENTS

| | | |
|---|---|---|
| JP | 2002-027526 | 1/2002 |
| JP | 2002-271835 | 9/2002 |
| JP | 2003-150692 | 5/2003 |
| JP | 2004-185329 | 7/2004 |
| JP | 2004-272330 | 9/2004 |
| JP | 2005-233812 | 9/2005 |
| JP | 2006-092128 | 4/2006 |
| JP | 2006-174013 | 6/2006 |
| JP | 2006-352518 | 12/2006 |
| KR | 1020020073671 A | 9/2002 |

* cited by examiner

*Primary Examiner* — Lester Kincaid
*Assistant Examiner* — Andy Gu
(74) *Attorney, Agent, or Firm* — Cozen O'Connor

(57) ABSTRACT

When detecting that an other cellular phone device 1 is present in the vicinity of a local cellular phone device 1 through a short-range wireless communication unit 24, a CPU 11 receives and acquires a communication-partner ID from the other cellular phone device 1 through the short-range wireless communication unit 24. Next, the CPU 11 creates a e-mail indicating that the communication partner is present in the vicinity of the local cellular phone device based on the communication-partner ID. Further, the CPU 11 sends a predetermined communication terminal 4 of the created e-mail from a telephone communication unit 15 through a public mobile communication network 2.

19 Claims, 11 Drawing Sheets

FIG. 3

ADDRESS BOOK

AD

| NAME | TELEPHONE NUMBER | ADDRESS | ID | NOTIFICATION DESTINATION |
|---|---|---|---|---|
| PERSON A | | | | — |
| PERSON B | | | | — |
| | | | | — |
| MOTHER | | | | O |

FIG. 9

PLAN CONDITION TABLE        SD

| | COMMUNICATION -PARTNER ID | TIME SPAN | PLACE |
|---|---|---|---|
| PLAN TO MEET | × × × | × × × | × × × |
| PLAN TO LEAVE | — | × × × | × × × |

…

MOBILE TERMINAL DEVICE, REMOTE NOTIFICATION METHOD AND RECORDING MEDIUM

BACKGROUND OF THE INVENTION

1. Field of the Invention

The present invention relates to a mobile terminal device having a short-range communication unit which performs short-range communication with an other communication terminal and a long-range communication unit which performs long-range communication with another communication terminal through a network, a remote notification method and a recording medium.

2. Description of the Related Art

In general, in a case where a child or an elderly goes out, if the child or the elderly does not contact the family, the family worries about the safety and the location where the child or the elderly is. Therefore, as disclosed in Unexamined Japanese Patent Application KOKAI Publications No. 2004-185329 and No. 2004-272330, conventionally known are technologies of regularly detecting a location where, for example, a child is present, and notifying a parent of information to that effect that the location where the child is present is a location other than, for example, an expected location when the child is at the unexpected location.

According to the technologies disclosed in the foregoing publications, a parent away from a child can figure out where the child is. However, it was difficult for the parent away from the child to figure out in what situation the child is and a situation around the child, such as whether or not the child is alone, whether or not the child is with a friend, and whether or not the child is with a stranger, even in using the foregoing technologies.

A family feels at an ease when a child goes out with a person whom the family knows well, but let us suppose that the child is separated from that well-known person at anywhere along the outgo. In such a case, even in using the foregoing technologies, the parent cannot figure out the current situation of the child if the child or the like does not make a contact with the family.

Such an inconvenience similarly occurs in a case where an observation target is a disabled person or an elderly.

In general, a child or an elderly is unfamiliar with operation of a cellular phone device. Accordingly, even in a case where the child or the elderly tries to notify a family of the current situation through an electronic mail, the child or the elderly often does not know how to operate the cellular phone to do notification. Further, the child or the elderly himself/herself even forgets making a contact with the family.

SUMMARY OF THE INVENTION

It is an object of the present invention to provide a mobile terminal device, a remote notification method and a recording medium recording program which embody remote notification of a current situation or the like of a user to a person away from the user without any particular operation.

To achieve the object, a mobile terminal device according to the first aspect of the invention comprises: a short-range communication unit which performs direct short-range communication with an other communication terminal; a long-range communication unit which performs long-range communication with another communication terminal through a network; a table in which information on a possessor is registered, a detection unit which detects an other communication terminal through the short-range communication unit; and a notification unit which creates information on a recent event of the possessor based on a detection result of the detection unit and information registered in the table, and notifies a predetermined communication terminal of the created information through the long-range communication unit.

To achieve the object, a remote notification method according to the second aspect of the invention comprises the steps of: detecting whether or not an other communication terminal is present in the neighborhood through a direct short-range communication with the other communication terminal; and creating information on a recent event of a possessor based on a result of the detection and information on the possessor, and notifying a predetermined communication terminal of the created information through a long-range communication.

To achieve the object, a recording medium recording a program according to the third aspect of the invention allows a computer to realize: a function of performing direct short-range communication with an other communication terminal; a function of performing long-range communication with another communication terminal device through a network; a function of detecting whether or not an other communication terminal is present in the neighborhood through a short-range communication; a function of creating information on a recent event of a possessor based on a result of the detection and information on the possessor, and of notifying a predetermined communication terminal of the created information through a long-range communication.

According to the mobile terminal device of the first aspect of the invention, the remote notification method of the second aspect of the invention, and the recording medium recording a program of the third aspect of the invention, the recent event of a user can be notified to a person away from the user without any particular operation.

BRIEF DESCRIPTION OF THE DRAWINGS

These objects and other objects and advantages of the present invention will become more apparent upon reading of the following detailed description and the accompanying drawings in which:

FIG. 3 is an explanatory diagram for an address book;

FIG. 9 is an explanatory diagram for a plan condition according to a second embodiment of the invention;

DETAILED DESCRIPTION OF THE PREFERRED EMBODIMENTS

First Embodiment

Figure 1:
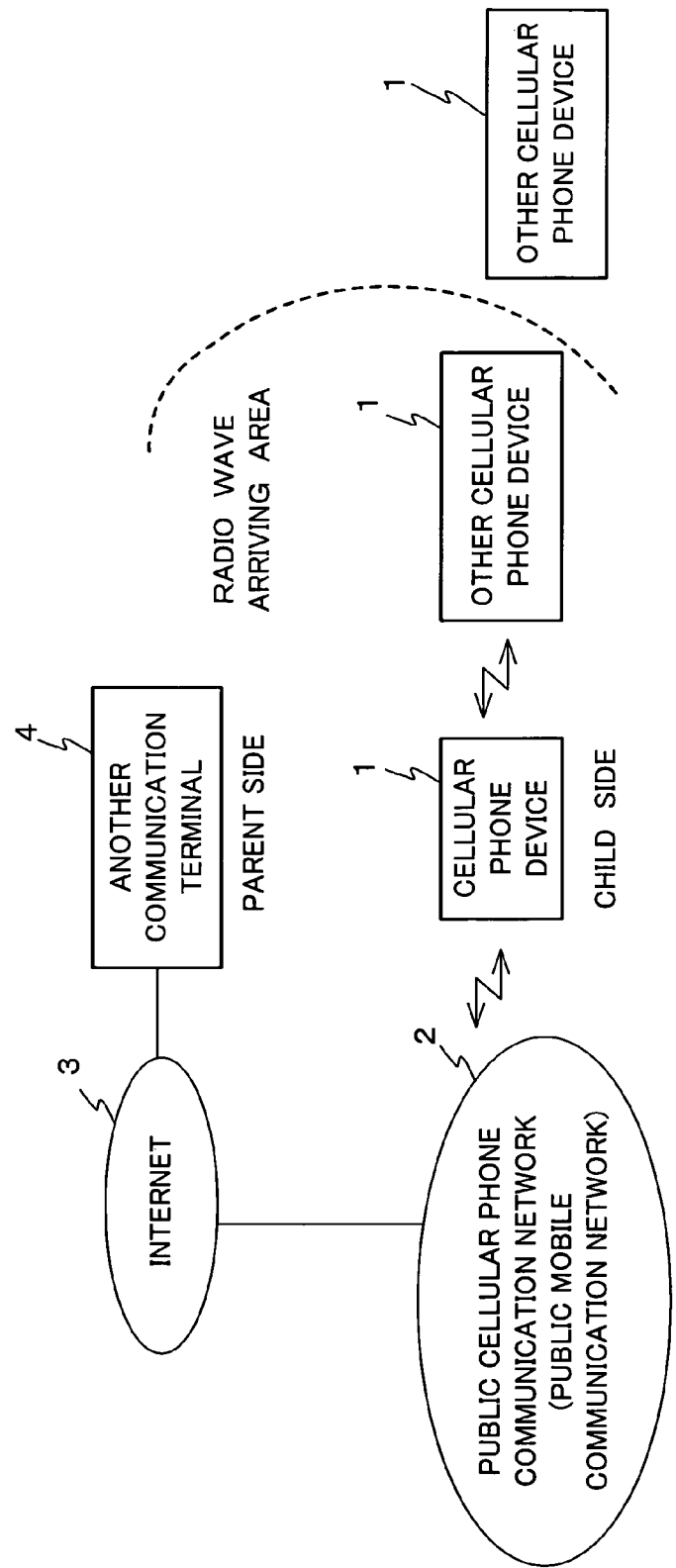
FIG. 1 is a block diagram showing the communication network of a cellular phone device used as a mobile terminal device according to a first embodiment of the invention.

The first embodiment of the invention will be explained with reference to FIGS. 1 to 8. A cellular phone device 1 has a telephone function (telephone call function), an electronic mail-function, an Internet connection function (Web access function), and further, a GPS function which can acquire a current position, a long-range wireless communication function, and a short-range wireless communication function. As shown in FIG. 1, the cellular phone device 1 is connected to the Internet 3 through an exchange, a nearest base station which constitutes a public cellular phone communication network (public mobile communication network) 2. The long-range wireless communication function is for performing long-range wireless communication (e.g., mail communication) with another communication terminal 4 through the Internet 3.

Another communication terminal 4 is, for example a communication device, such as a cellular phone device or a PC (Personal Computer) which has a telephone function (telephone call function) and an electronic mail function. The cellular phone device 1 can transmit an electronic mail to the communication terminal 4. In the embodiment, let us suppose that the cellular phone device 1 is possessed by a child, while the communication terminal 4 is used by the parent of that child. The cellular phone device 1 at the child side stores and manages the "electronic mail address" of the communication terminal 4 at the parent side.

The short-range wireless communication function is for performing short-range wireless communication (e.g., Bluetooth communication) with an other communication terminal (e.g., an other cellular phone device 1 in FIG. 1) which is present in the vicinity of (within a range where communication is possible) the cellular phone device 1 in a communication standby state. The short-range wireless communication function is used for detecting the situation around the child, e.g., what person is together with the child. The cellular phone device 1 at the child side notifies the communication terminal 4 at the parent side of the situation around the child like what person is together with the child, acquired through the short-range wireless communication function, via an electronic mail.

Figure 2:
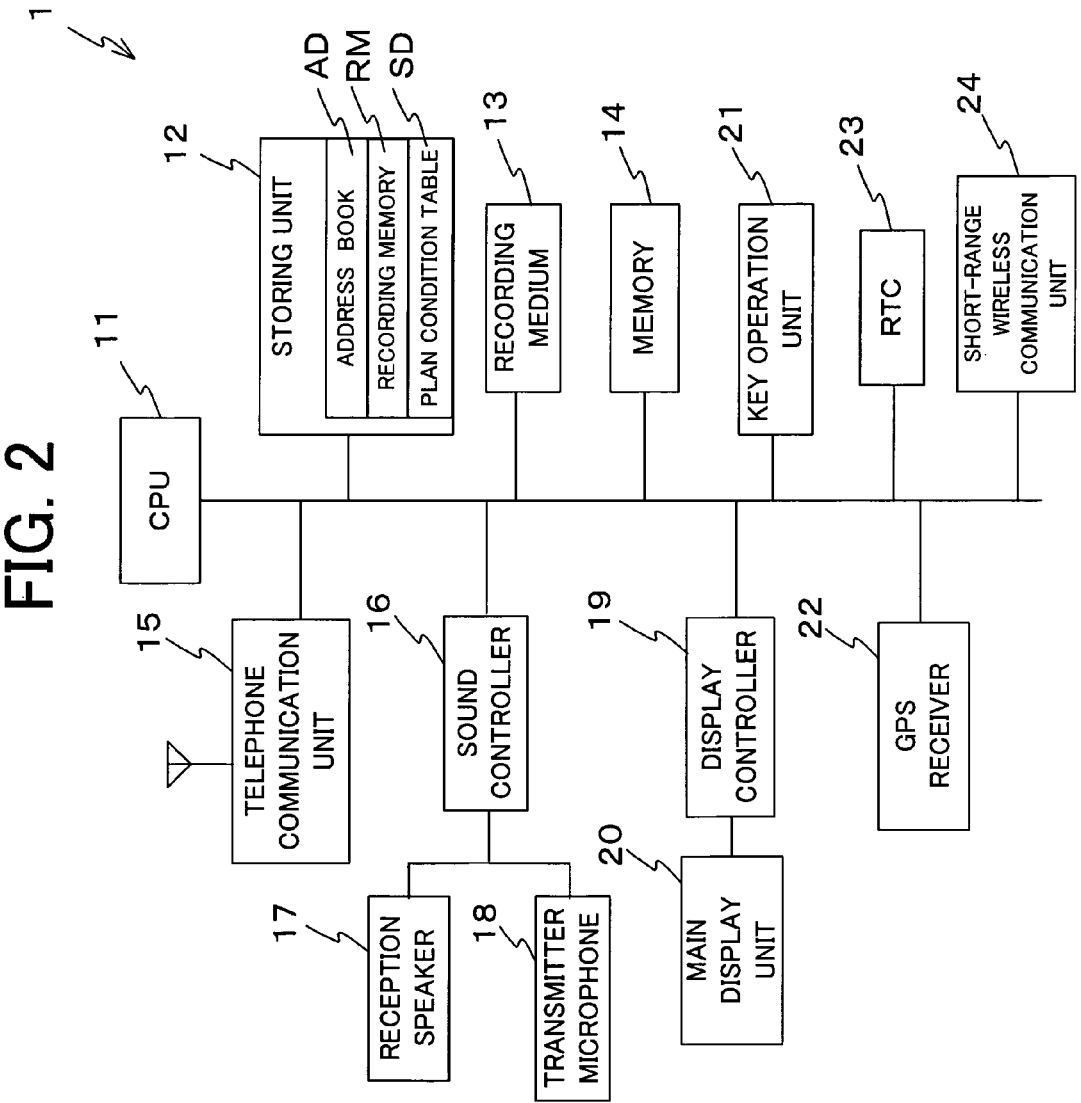
FIG. 2 is a block diagram showing general structural components of a cellular phone device.

As shown in FIG. 2, as general structural components, the cellular phone device 1 comprises a CPU 11, a storing unit 12, a recording medium 13, a memory 14, a telephone communication unit 15, a sound controller 16, a reception speaker 17, a transmitter microphone 18, a display controller 19, a main display unit 20, a key operation unit 21, a GPS receiver 22, an RTC 23, and a short-range wireless communication unit 24.

The CPU 11 is a core central processing unit which controls the entire operations of the cellular phone device 1 in accordance with various programs stored in the storing unit 12. The storing unit 12 is an internal memory. The storing unit 12 has memory areas divided into a program area and a data area (both not shown). The program area of the storing unit 12 stores a program for embodying the embodiment in accordance with operation procedures to be discussed later and shown in FIGS. 6 to 8. The data area of the storing unit 12 is provided with areas which store an address book AD, a recording memory RM, a plan condition table SD, and the like to be discussed later.

The recording medium 13 is a portable and removable memory. The recording medium 13 externally provides various data and programs like a recorded content. Possible external recording medium is, for example, an SD card, or an IC card.

The memory 14 is an internal memory having a work area. Various data stored in the memory 14 are saved in the data area of the storing unit 12 in accordance with necessity.

The telephone communication unit 15 is for embodying the foregoing long-range wireless communication function. The telephone communication unit 15 acquires a signal from the reception side of a transmission/reception unit (baseband unit) constituting a wireless unit and connected to an antenna, and demodulates the signal to a reception baseband signal. The demodulated reception baseband signal is subjected to audio output from the reception speaker 17 through the sound controller 16. The telephone communication unit 15 acquires audio data input from the transmitter microphone 18 through the sound controller 16, and encodes the acquired audio data to transmission baseband signal. The encoded signal is sent to the transmission side of the transmission/reception unit, and transmitted from the antenna. On the other hand, a content received and acquired through the telephone communication unit 15 by the Internet connection function or the like is given to the main display unit 20 through the display controller 19, and displayed.

The key operation unit 21 is an operation input device for a dial inputting, a character inputting, a command inputting, and the like. The key operation unit 21 has number/character input keys, dial keys, a mode selection key, and the like. The CPU 11 executes a process in accordance with a key input signal from the key operation unit 21. The GPS (Global Positioning System) receiver 22 utilizes a GPS satellite (not shown) and a ground base station to receive a current position (latitude and longitude information) of the cellular phone device 1. The CPU 11 periodically accesses the GPS receiver 22, and receives and acquires a current position of the cellular phone device 1. The RTC (Real Time Clock) module 23 constitutes a clock unit which acquires a current date and time (year, month, day, hour, minute, and second). The CPU 11 acquires a current date and time from the RTC module 23.

The short-range wireless communication unit 24 performs short-range wireless communication with a neighborhood cellular phone device 1 by the Bluetooth communication scheme, for example. In a communication standby state, in a case where an other communication terminal having a short-range wireless communication function (e.g., an other cellular phone device 1 in FIG. 1) is within a radio wave arriving area (e.g., within 10 m diameter), the short-range wireless communication unit 24 of the cellular phone device 1 of the child and the short-range wireless communication unit 24 of the other cellular phone device 1 automatically establish a communication with each other (see, FIG. 1). The CPU 11 detects whether or not an other cellular phone device 1 is present in the vicinity of the child's cellular phone device 1 through the short-range wireless communication unit 24. When detecting that an other cellular phone device 1 is present in the vicinity of the child's cellular phone device 1 through an automatic communication of the short-range wireless communication unit 24, the CPU 11 receives and acquires communication-partner identification information (communication-partner ID) from the neighborhood cellular phone device 1 through the short-range wireless communication unit 24. Subsequently, the CPU 11 determines whether or not the neighborhood "communication partner" is a communication partner registered beforehand based on the acquired "communication-partner ID". As a result of the determination, when the neighborhood "communication partner" is a registered communication partner, the CPU 11 creates and sends an electronic mail indicating that the registered communication partner is present in the vicinity of the child's cellular phone device 1, and when the neighborhood communication partner is not a registered communication partner, the CPU 11 creates and sends an electronic mail indicating that unknown communication partner is present in the vicinity of the child's cellular phone device 1. The electronic mail for notification is sent to the communication terminal 4 (see, FIG. 1) arbitrary designated beforehand (e.g., the family like the mother).

Subsequently, an explanation will be given of the data structure of the data area in the storing unit 12 in detail. As shown in FIG. 2, the data area of the storing unit 12 has the storage areas for the address book AD, the recording memory RM, and the plan condition table SD. The cellular phone device 1 of the embodiment uses the address book AD and the recording memory RM, and the plan condition table SD will be used by a cellular phone device 1 of the second embodiment to be discussed later.

First, the address book AD will be explained. As shown in FIG. 3, the address book AD stores and manages information on communication partners for each communication partner. Individual items of "name", "telephone number", "(mail) address", "communication partner ID", and "notification destination flag" of a communication partner are registered in the address book AD. The contents of individual items are arbitrary set beforehand by a user operation. In FIG. 3, as an example, person's names A and B, and the mother's name are set as "communication partner names". In a case where the user himself/herself is, for example, a kindergarten child, a youth elementary school student, a disabled person, or the like, then the "communication-partner ID" of the communication partner becomes communication-partner identification information for identifying a classmate, a teacher, a friend, a family, or the like. In this case, unique numbers are allocated beforehand to individual persons of the class (including a teacher)/friend/family. The communication-partner identification numbers of the individual persons are set as the "communication-partner IDs" in the address book AD. The "notification destination flag" is for setting the notification destination to which a neighborhood situation is notified through an electronic mail. The flag is set for only a person to be notified the neighborhood situation through an electronic mail in the persons registered in the address book AD. As shown in FIG. 3, in the embodiment, the mother of the child is designated as the "notification destination". Note that plural notification destination flags can be set. In this case, electronic mails are to be concurrently sent to all persons to which the notification destination flags are set.

Figure 4:
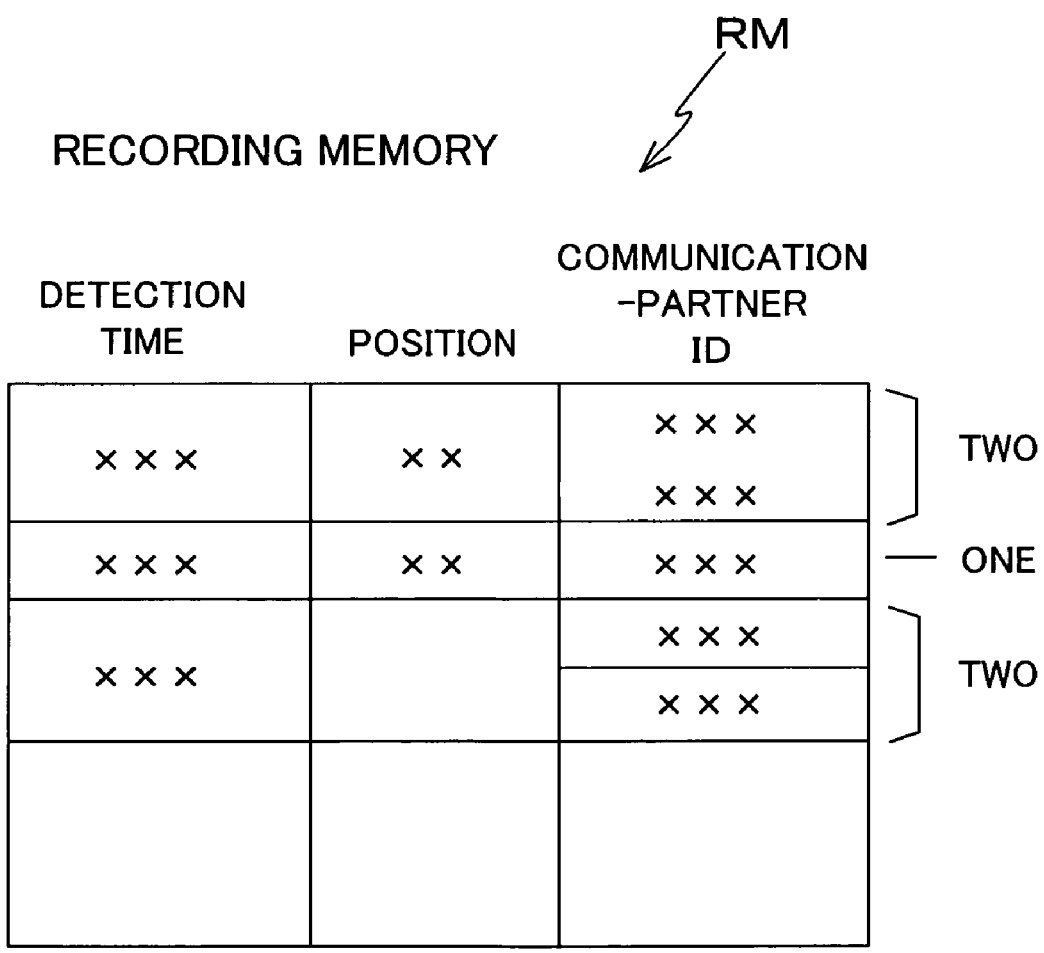
FIG. 4 is an explanatory diagram for a recording memory.

Subsequently, the recording memory RM will be explained. As shown in FIG. 4, the recording memory RM successively records neighborhood situations such that an other cellular phone device 1 is present in the vicinity of the child's cellular phone device 1. The presence of an other cellular phone device 1 is detected at a predetermined timing through the start of a communication of the short-range wireless communication unit 24, and is successively recorded in the recording memory RM as it is detected. The recording memory records a information corresponding to individual items of a "detection time", a "position", and a "communication-partner ID" when they are detected as a neighborhood situation. Specifically, a current time acquired from the RTC 23, and position information acquired from the GPS receiver 22 are recorded as "detection time" and "position", respectively. Information (communication-partner identification information), for identifying a person who possesses an other cellular phone device 1 present in the vicinity of the child's cellular phone device 1, is recorded as a "communication-partner ID". When the communication partner is not registered in the address book AD, an ID indicating that an unknown communication partner is present in the vicinity of the child's cellular phone device 1 (unknown ID) is to be recorded. As shown in FIG. 4, in a case where a plurality of other cellular phone devices 1 are detected at the same timing, a plurality of "communication-partner IDs" for the same "detection time" and "position" are to be recorded.

Meanwhile, plural different operation modes are prepared for the cellular phone device 1. One of those is an "ID detection mode". The "ID detection mode" is an operation mode which detects a neighborhood situation through the short-range wireless communication unit 24. Only in a case where the "ID detection mode" is set, a neighborhood situation is to be detected. The "ID detection mode" can be arbitrary set by operating the mode setting key of the key operation unit 21. That is, the "ID detection mode" can be set or canceled by operating the mode setting key.

In the "ID detection mode", further, two operation modes can be set: "collective notification mode"; and "prompt notification mode". Both "collective notification mode" and "prompt notification mode" can be arbitrary set by operating the mode setting key in the key operation unit 21.

In a case where the "ID detection mode" is set, when the "prompt notification mode" is designated, every time a neighborhood situation is detected, the CPU 11 promptly performs notification of the neighborhood situation through an electronic mail. On the other hand, when the "collective notification mode" is designated, the CPU 11 once successively saves neighborhood situations in the recording memory RM, and reads out the contents of the recording memory RM collectively at a predetermined timing, for every hour, and performs notification of those through an electronic mail. Recording in the recording memory is executed only when the "collective notification mode" is set. In the "prompt notification mode", two operation modes can be designated: "first mode"; and "second mode". Those operation modes will be explained in detail later.

Figure 5:
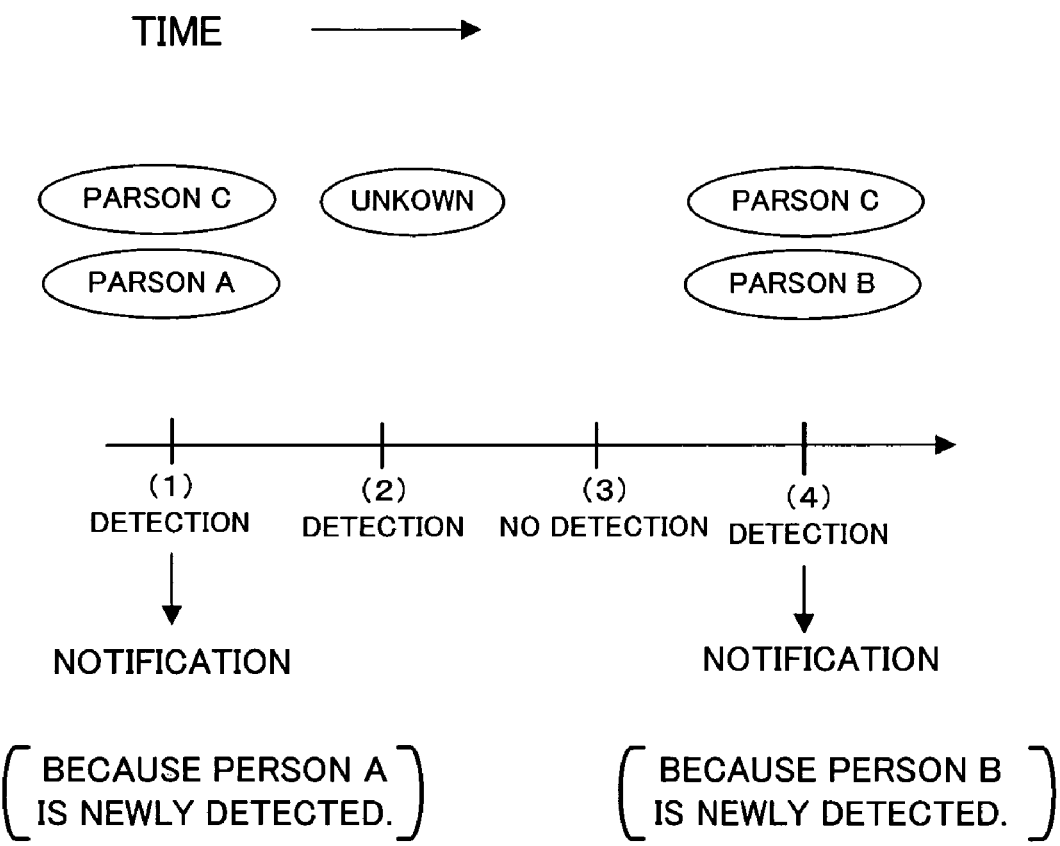
FIG. 5 is an explanatory diagram for contents successively recorded in the recording memory in a "collective notification mode"

FIG. 5 is an explanatory diagram for examples of contents successively recorded in the recording memory RM in the "collective notification mode".

The CPU 11 detects a neighborhood situation through the short-range wireless communication unit 24 at a predetermined time interval, e.g., at one minute interval. For example, as shown in FIG. 5, let us suppose that at a detection timing (1), cellular phone devices 1 possessed by a "person A" and a "person C" are detected and at a next detection timing (2), only a cellular phone device 1 of an "unknown communication partner" is detected. Further, at a following detection timing (3), no cellular phone device 1 is detected, so that the detection result becomes "no detection", and at a next detection timing (4), cellular phone devices 1 possessed by a "person B" and the "person C" are detected. In this case, at the detection timing (1), the "communication-partner IDs" of the two persons (person A and person C) are recorded in the recording memory RM, at the detection timing (2), the "communication-partner ID" of the one person (unknown communication partner) is recorded in the recording memory RM, and at the detection timing (4), the "communication-partner IDs" of the two persons (person B and person C) are recorded in the recording memory RM.

Next, the conceptual operation of the cellular phone device in the first embodiment will be explained with reference to the flowcharts of FIGS. 6 to 8. Note that individual functions written in the flowcharts are stored in the forms of readable program codes in the program area of the storing unit 12. The CPU 11 successively executes processes according to the program codes. The CPU 11 may successively execute processes according to program codes transmitted through a transmission medium. The same is true on a following second embodiment to be discussed later, and a cellular phone device according to the second embodiment can perform operation peculiar to that embodiment by utilizing a program/data externally provided through a transmission medium, in addition to a program/data stored in the storing unit 12.

Figure 6:
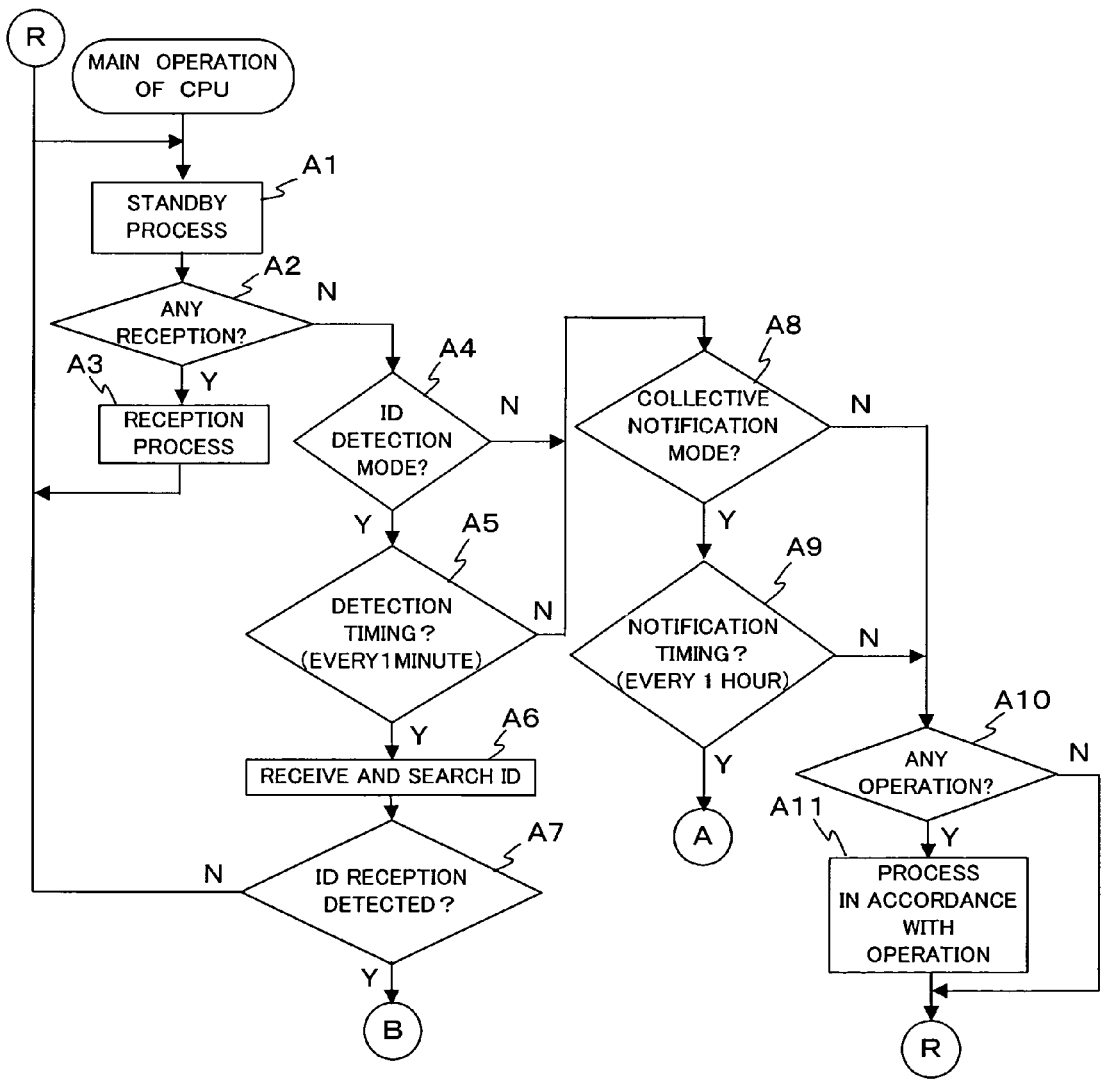
FIG. 6 is a flowchart showing the main operation of a CPU in a cellular phone device of which execution is started in accordance with power activation.
Figure 7:
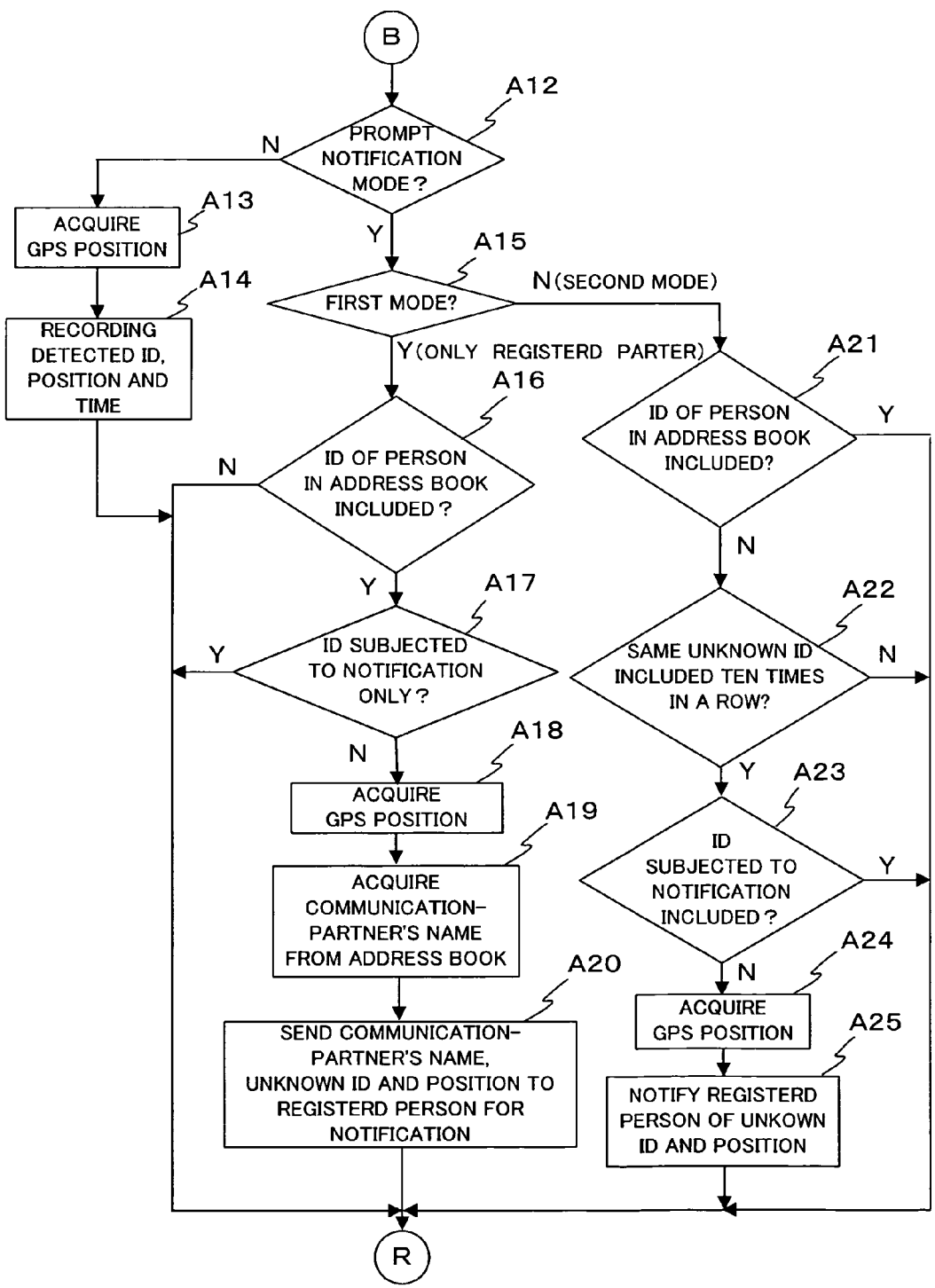
FIG. 7 is a flowchart continuous from FIG. 6.
Figure 8:
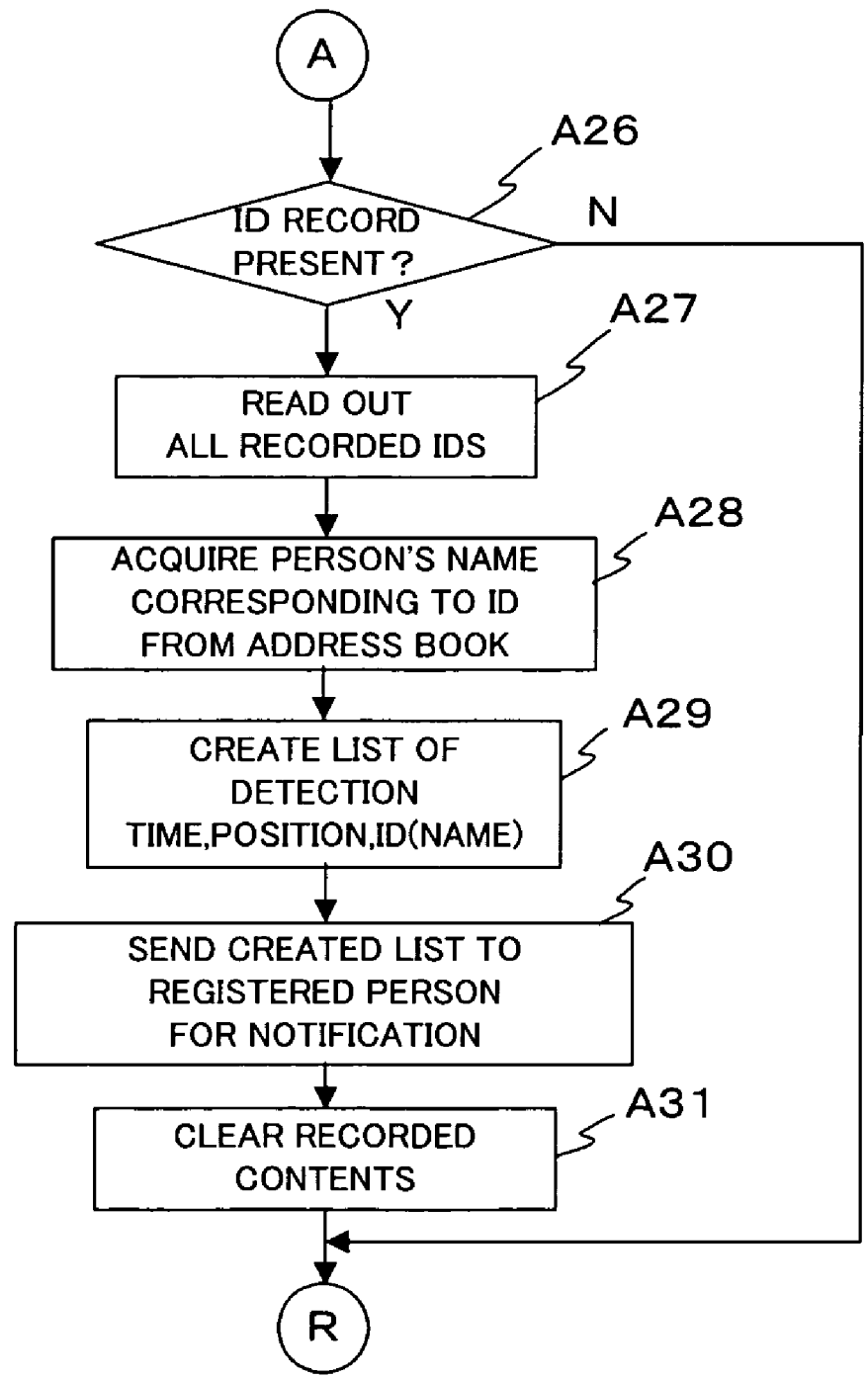
FIG. 8 is a flowchart continuous from FIG. 6.

FIGS. 6 to 8 are flowcharts showing the main operation of the CPU 11 in the cellular phone device 1 which is executed and started after power is turned on.

First, the CPU 11 causes the telephone communication unit 15 to execute a standby process for registering a current position (step A1 in FIG. 6). Next, the CPU 11 checks presence/absence of a telephone/mail signal (step A2). When detecting reception of a telephone/mail (step A2: YES), the CPU 11 performs incoming alert of, for example, generating and outputting a incoming alert melody, and executes a telephone or mail reception process (step A3). After the reception process is executed, the CPU 11 returns to the standby state (step A1).

On the other hand, when no telephone/mail reception is detected in the step A2, and the CPU 11 is still in the standby state, the flow progresses to step A4. The CPU 11 checks whether or not the "ID detection mode" is set through the short-range wireless communication unit 24 (step A4). When the "ID detection mode" is not set (step A4: NO), the CPU 11 checks whether or not the "collective notification mode" is set (step A8). When the "collective notification mode" is not set (step A8: NO), the CPU 11 checks whether or not any operation through the key operation unit 21 is performed (step A10). When any operation is performed (step A10: YES), the CPU 11 executes, for example, an outgoing telephone process, a e-mail creation process, or a e-mail transmission process, as a process corresponding to the key operation (step A11). After the process at the step A11 is executed and after the determination result at the step A10 becomes negative, the CPU 11 returns to the standby state (step A1).

(ID Detection Mode)

The explanation will be returned to the step A4. When the "ID detection mode" is currently set, the determination result becomes positive (step A4: YES), and the CPU 11 checks whether or not a current time point is a detection timing at which a situation around the cellular phone device 1 is to be detected (step A5). The CPU 11 detects whether or not an other cellular phone device 1 is present in the vicinity of the cellular phone device 1 through the short-range wireless communication unit 24 at that detection timing, e.g., every one minute. When the current time point is not a detection timing (step A5: NO), the flow goes to the foregoing step A8. On the other hand, when the current time point is a detection timing (step A5: YES), the CPU 11 accesses the short-range wireless communication unit 24, and searches the reception of a "communication-partner ID" (step A6). After the process at the step A6 is executed, the CPU 11 determines whether or not an other cellular phone device 1 is present in the vicinity of the cellular phone device 1, i.e., whether or not communication-partner identification information (communication-partner ID) is received and acquired from an other cellular phone device 1 present in the vicinity of the cellular phone device 1, through an automatic communication with the other cellular phone device 1 via the short-range wireless communication unit 24 (step A7). When determining that no "communication-partner ID" is received and acquired, i.e., when an other cellular phone device 1 is not present in the vicinity of the cellular phone device 1 (step A7: NO), the CPU 11 returns to the standby state (step A1 in FIG. 6), but when determining that one or a plurality of "communication-partner IDs" are received and acquired, i.e., when other cellular phone devices 1 are present in the vicinity of the cellular phone device 1 (step A7: YES), the process shifts to the flow in FIG. 7.

(Prompt Notification Mode)

In the "ID detection mode", when the determination result at the step A7 becomes positive, the CPU 11 checks whether or not the "prompt notification mode" is selected (step A12). When the "prompt notification mode" is designated, the flow progresses to step A15. The CPU 11 further checks whether or not the "first mode" or the "second mode" is selected (step A15). The "first mode" and "second mode" are operation modes of the CPU 11 which can be set under the "prompt notification mode". In the "first mode", the CPU 11 performs notification through an electronic mail when the received and acquired "communication-partner ID" is registered in the address book AD (a case where the registered communication partner is present nearby). In the "second mode", the CPU 11 performs notification through an electronic mail under a certain condition when the received and acquired "communication-partner ID" is not registered in the address book AD (a case where an unknown communication partner is present nearby). Therefore, in the "first mode" under the "prompt notification mode", when only unknown communication partner is present in the vicinity of the cellular phone device 1, notification through an electronic mail is not executed, and in the "second mode" under the "prompt notification mode", when at least one or more registered communication partners around the child, notification through an electronic mail is not executed.

(First Mode)

When it is determined that the "first mode" is set under the "prompt notification mode" (step A15: YES), the flow progresses to step A16. The CPU 11 checks whether or not the received "communication-partner IDs" include a "communication-partner ID" registered in the address book AD, i.e., searches the address book AD based on the received and acquired "communication-partner IDs" and checks whether or not at least one of them is a registered communication partner registered in the address book AD (step A16). When determining that there is no registered communication partner nearby (step A16: NO), the CPU 11 does not perform notification through an electronic mail, and returns to the standby state (step A1 in FIG. 6). On the other hand, when there is at least one registered communication partner (step A16: YES), the CPU 11 checks whether or not a "communication-partner ID" of a person already subjected to notification to which an electronic mail was sent at a previous detection is included, i.e., whether or not a new "communication-partner ID" is included at a present detection to avoid duplicative notification of the same content (step A17).

That is, in the step A17, when a communication-partner ID detected at a previous detection timing is temporarily stored, the CPU 11 compares the communication-partner ID detected at the previous detection timing with a communication-partner ID detected at a present detection timing. The CPU 11 checks whether or not a "communication-partner ID" already subjected to notification is included (whether or not a new communication-partner ID is included). For example, let us consider a case where only the "person C" is detected as the communication partner registered in the address book AD at the previous detection timing, and only the "person C" is detected at the present detection timing. In this case, no new communication partner is included in the present detection, the CPU 11 determines in the step A17 that "only the ID already subjected to notification is acquired", and returns to the standby state (step A1 in FIG. 6). On the other hand, let us consider a case where the "person A" is newly detected as a registered communication partner in addition to the "person C" at the present detection timing. In this case, the CPU 11 determines in the step A17 that "a new ID is detected in addition to the ID already subjected to notification", and the flow progresses to step A18. The CPU 11 acquires a current position from the GPS receiver 22 (step A18). After the process at the step A18 is executed, the CPU 11 searches the address book AD based on the "communication-partner ID" received and acquired at the present detection, and reads out a corresponding "communication-partner's name" (step A19).

In a case where a plurality of "communication-partner IDs" for new communication partners are received and acquired at the present detection timing, if all of those are registered communication partners registered in the address book AD, the CPU 11 reads out the "names" of all communication partners, but if even a single unknown communication partner is included, the CPU 11 sets the "communication-partner ID" thereof as an "unknown ID", and uses this "unknown ID" instead of a "communication partner's name". The CPU 11 creates an e-mail (neighborhood-situation informing mail) including a "communication partner's name", a "current position", and an "unknown ID" if an unknown communication partner is included, as neighborhood information. Subsequently, the CPU 11 checks the address book AD, and reads out a "mail address" of a person to which the "notification destination flag" is set. Further, the CPU 11 sends the neighborhood-situation informing mail to that "mail address" (step A20). The neighborhood-situation informing mail includes a content which indicates that a registered communication partner is present in the vicinity of the child. Therefore, the e-mail can include sentences such as "the child is together with the "person A" who is a registered communication partner", and "the child is together with the "person A" who is a registered communication partner, but a stranger (X) is present near the child".

(Second Mode)

Return to the step A15, and the explanation will be given of the second mode. When the "second mode" is set in the "prompt notification mode", the determination result at the step A15 becomes negative. In this case, like the step A16, the CPU 11 checks whether or not a "communication-partner ID" registered in the address book AD is included in the received and acquired "communication-partner IDs" (step A21). In a case where even a single communication partner registered in the address book AD is present in the vicinity of the child (step A21: YES), the CPU 11 returns to the standby state (step A1 in FIG. 6). On the other hand, when there is no registered communication partner, but only an unknown communication partner is present (step A21: NO), the CPU 11 checks whether or not the same "unknown ID" is included for ten times in a row (step A22). Every time the same unknown communication partner is detected, the CPU 11 updates the continuous detection number in association with the "unknown ID". When the same "unknown ID" is not detected continuously, the CPU 11 resets the continuous detection number.

When the same "unknown ID" is continuously detected for more than ten times, i.e., when it is determined that the same unknown person is present in the vicinity of the child for ten minutes (step A22: YES), the flow progresses to step A23. Likewise the foregoing case, the CPU 11 checks whether or not a "communication-partner ID" already subjected to notification through an electronic mail at a previous detection is included (whether or not only a "communication-partner ID" newly detected at this time is included). On the other hand, when the same "unknown ID" is not continuously detected ten times (step A22: NO), a notification condition is not satisfied, and the CPU 11 returns to the standby state (step A1 in FIG. 6). In a case where the same "unknown ID" is continuously detected ten times and the determination result at the step A22 becomes positive, when it is determined that a "communication-partner ID" already subjected to notification is included (step A23: YES), the CPU 11 returns to the standby state (step A1 in FIG. 6) to avoid duplicative notification.

When determining in the step A23 that only new unknown communication partners are included, the CPU 11 acquires a current position from the GPS receiver 22 (step A24). Next, the CPU 11 creates a neighborhood-situation informing mail including all "unknown IDs" and the "position information", checks the address book AD, reads out the "mail address" of a communication partner to which the "notification destination flag" is set, and sends the neighborhood-situation informing mail to the "mail address" (step A25). The neighborhood-situation informing mail has a content indicating that only unknown person is present in the vicinity of the child. For example, the e-mail has a sentence such as "only unknown person is present around the child".

(Collective Notification Mode)

Return to the step A12, and the explanation will be given of the "collective notification mode".

When the "collective notification mode" is selected in the "ID detection mode" and the determination result at the step A12 becomes negative (step A12 in FIG. 7: NO), the flow progresses to step A13. The CPU 11 acquires a current position from the GPS receiver 22, and acquires a current time from the RTC 23 (step A13). Next, the CPU 11 writes the "current position" and the "current time" in association with a received and acquired "communication-partner ID" in the recording memory RM (step A14). Thereafter, the CPU 11 returns to the standby state (step A1 in FIG. 6). When the "ID detection mode" is set (step A4: YES), every time a detection timing of a neighborhood situation comes (step A5: YES), if an other cellular phone device 1 is present in the vicinity of the child's cellular phone 1 (step A7: YES), and the "prompt notification mode" is not set (step A12: NO), a process of successively saving "communication-partner IDs", "current positions", and "current times" in the recording memory RM is repeated (steps A13, A14).

Return to the step A5 in FIG. 6, the CPU 11 determines in the step A5 whether or not it is a detection timing, and when the determination result becomes negative, the flow progresses to the step A8. When the "collective notification mode" is set (step A8 in FIG. 6: YES), the CPU 11 checks whether or not it becomes a timing (notification timing) at which the contents of the recording memory RM are subjected to collective notification (step A9). In the embodiment, a notification timing comes, for example, for each hour, and in this case, every time one hour elapses, collective notification to the communication terminal 4 is executed.

At a time when the process at the step A9 is executed, if it is not a notification timing, the flow progresses to the step A10. On the other hand, when it is a notification timing (step A9: YES), the process progresses to the flow in FIG. 8. First, the CPU 11 checks whether or not a "communication-partner ID" is recorded in the recording memory RM (step A26). As a result, when no single "communication-partner ID" is recorded (step A26: NO), the CPU 11 returns to the standby state (step A1 in FIG. 6). On the other hand, when even a single "communication-partner ID" is recorded (step A26: YES), the CPU 11 reads out all "communication-partner IDs"

(step A27). Subsequently, the CPU 11 searches the address book AD, and reads out all corresponding "names" based on the "communication-partner IDs" (step A28).

Next, the CPU 11 reads out a "detection time" and a "position" both associated with each "communication-partner ID" from the recording memory RM, and creates a list of a "communication-partner's name", a "detection time", and a "position" (step A29). Subsequently, the CPU 11 refers the address book AD, reads out a "mail address" of a person to which the "notification destination flag" is set, and sends the created list to the "mail address" through an electronic mail (step A30). Thereafter, the CPU 11 deletes all contents in the recording memory RM (step A31). After the process at the step A31 is executed, the CPU 11 returns to the standby state (step A1 in FIG. 6).

As explained above, according to the first embodiment, when detecting through the short-range wireless communication unit 24 that an other cellular phone device 1 is present in the vicinity of the child's cellular phone device 1, the CPU 11 receives and acquires a "communication-partner ID" from the other cellular phone device 1 through the short-range wireless communication unit 24 (step A6 in FIG. 6). Subsequently, the CPU 11 creates a e-mail having a content indicating that a communication partner is present in the vicinity of the child's cellular phone device 1 based on the "communication-partner ID", and sends the created e-mail to the predetermined communication terminal 4 by the telephone communication unit 15 through the public cellular phone communication network 2 (steps A20 and A25 in FIG. 7, and step A30 in FIG. 8). Accordingly, neighborhood information around a child or an elderly, such as whom the child or the elderly is together with, is automatically notified to the predetermined communication terminal 4. Therefore, even if a child or an elderly who is unfamiliar with operation does not carry out a particular operation to the cellular phone device 1, a neighborhood situation around the child or the elderly can be remotely notified to a family away from the child or the elderly. This enables the family to remotely detect the child or the elderly.

Moreover, according to the embodiment, when the "first mode" is designated, the CPU 11 searches the address book AD based on "communication-partner IDs" received and acquired from the other neighborhood cellular phone devices 1, and when at least one of them is a registered communication partner registered in the address book AD, the CPU 11 creates an electronic mail indicating that a registered person is present around the child, and automatically sends the e-mail to the communication terminal 4 (steps A16 to A20 in FIG. 7). This allows the parent who receives a notification through the electronic mail to figure out that the child possessing the cellular phone device 1 is together with a classmate, a friend, a teacher, or the like.

Further, according to the embodiment, in a case where the "second mode" is designated, when no single registered person registered in the address book AD is included in the "communication-partner IDs" received and acquired from other cellular phones 1 around the child and when only an unknown person is present around the child, the CPU 11 creates a e-mail indicating that only an unknown person is present around the child, and automatically sends the e-mail to the communication terminal 4 (steps A21 to A25 in FIG. 7). This allows the parent who receives a notification through the electronic mail to call or send a e-mail to the child to cause the child to, for example, return to a place where a classmate, a friend, or a teacher is present.

Still further, according to the embodiment, when the "second mode" is selected, every time an unknown person is detected, if a notification condition that the same unknown person is detected ten times in a row (in the embodiment, corresponding to ten minutes) is satisfied, the CPU 11 automatically notifies the communication terminal 4 of that effect through an electronic mail (step A22 in FIG. 7). If a stranger is present in the vicinity of the child for about ten minutes, this means that the stranger may be a loiterer, so that notification to that effect is desirable.

According to the embodiment, in a case where the "prompt notification mode" is set in the "ID detection mode", when it is detected that a registered communication partner and an unknown person are present in the vicinity of the child, the CPU 11 automatically and instantaneously notifies the communication terminal 4 of that effect through an e-mail (step A12, and steps A15 to A25 in FIG. 7). This allows the parent to figure out the neighborhood situation around the child or the like by checking the electronic mail, and gives an opportunity for the parent to take any action.

According to the embodiment, even in a case where the "prompt notification mode" is set, only when it is detected that an other cellular phone device 1 is present in the vicinity of the child's cellular phone device 1, notification through an electronic mail is carried out. Therefore, in comparison with a case where a neighborhood situation is always detected and successively informed, the invention is advantages in terms of a communication traffic and a communication time.

According to the embodiment, in a case where the "collective notification mode" is designated in the "ID detection mode", every time it is detected that a registered person or an unknown person is present in the vicinity of the child, a "current position" and a "current time" in association with a "communication-partner ID" are written in the corresponding items "communication-partner ID", "position", and "detection time" in the recording memory RM. At a notification timing which occurs every one hour, the contents of the recording memory RM are collectively read out and sent (steps A8 and A9 in FIG. 6, steps A12 to A14 in FIG. 7, and steps A26 to A31 in FIG. 8). This allows, for example, the parent who received a notification to analyze the activity of the child based on the content of the collective notification. Further, the "collective notification mode" is advantageous in terms of a communication traffic and a communication time in comparison with the "prompt notification mode".

According to the embodiment, when the "first mode" is set, the CPU 11 compares a communication-partner ID detected at a previous detection timing with a communication-partner ID detected at a present detection timing, and determines whether or not a "communication-partner ID" already subjected to notification is included (whether or not a new communication-partner ID is included). When a new communication-partner ID is included, the CPU 11 performs notification to that effect through an electronic mail (steps A17 to A20 in FIG. 7). This prevents duplicative notification of the same detection content.

According to the embodiment, when collectively sending the contents of the recording memory RM, the CPU 11 creates a list of a "position", and a "detection time" for each "communication-partner ID" and sends it to the communication terminal 4 (step A29 in FIG. 8). This enables the parent who receives notification to specifically figure out the activity of the child, such that the child was together with a friend for ten minutes, but then becomes alone without moving to any place.

According to the embodiment, only when the "ID detection mode" is set, the CPU 11 detects a neighborhood situation through the short-range wireless communication unit 24 (steps A4 to A7 in FIG. 6). Accordingly, the cellular phone device 1 can inform the neighborhood situation in accordance with necessity. Note that in the "ID detection mode" the "prompt notification mode" and the "collective notification mode" can be switched over in accordance with necessity.

According to the first embodiment, a detection timing comes every one minute, and a notification timing comes every one hour (steps A5 and A9 in FIG. 6). However, the timings can be set and changed arbitrary in accordance with a user operation.

In an emergency case, a neighborhood situation may be always detected regardless of a detection timing. For example, the parent who received notification may remotely operate the cellular phone device 1 to always detect a neighborhood situation. Further, according to the embodiment, when the same unknown communication partner is detected ten times in a row, notification through an electronic mail to the communication terminal 4 is performed, but that number may be set and changed arbitrarily.

Second Embodiment

Next, an explanation will be given of the second embodiment of the invention with reference to FIGS. 9 to 11.

The cellular phone device 1 of the first embodiment detects the neighborhood situation around a child, such as whom the child is together with, and performs remote notification of the situation. However, a cellular phone device 1 of the second embodiment detects whether or not the child acts in accordance with a plan, and performs remote notification of that situation to the parent's communication terminal 4.

Namely, the cellular phone device 1 of the second embodiment detects whether or not a predetermined person is present in the vicinity of the child, and determines whether or not a condition of an "activity plan" is satisfied. Subsequently, the cellular phone device 1 of the embodiment creates "activity information" indicating the detection result and whether or not the child acts as planned based on the determination result. Further, the cellular phone device 1 of the embodiment notifies the predetermined communication terminal 4 (see, FIG. 1) of the created "activity information" through a long-range wireless communication function.

Structural components which are basically the same as those of the first embodiment in names are denoted by the same reference numerals, and the explanation thereof will be omitted. Hereinafter, an explanation will be mainly given of the characteristic part of the second embodiment.

As explained in the first embodiment, the data area of the storing unit 12 has the address book AD, the recording memory RM, and the plan condition table SD (see, FIG. 2). The address book AD and the recording memory RM are already explained in the foregoing embodiment, so that only the plan condition table SD will be explained below.

The plan condition table SD stores a plan condition indicating the "activity plan" of the child. For example, in a case where there is a plan that the child is supposed to meet a person, the table stores the contents of the plan, such as whom, when, where the child meets, and when and where the child leaves to say good-bye, as a plan condition. The contents of the plan condition table SD can be arbitrary set by a user operation. The plan condition set in the plan condition table SD can be divided into two conditions: a first plan condition; and a second plan condition. The first plan condition corresponds to a "plan to meet a person". In the plan condition table shown in FIG. 9, individual items of the first plan condition are set in the filed "plan to meet". Possible items set as the first plan condition are a "communication-partner ID" for identifying a person supposed to meet the child, a "planned time span" around when the child are supposed to meet the person, and a "planned place (latitude and longitude information) around where the child is supposed to meet, and the like.

The second plan condition corresponds to a "plan to leave". In the plan condition table shown in FIG. 9, individual items of the second plan condition are set in the field "plan to leave". Possible items set as the second plan condition are "communication-partner ID" for identifying a person supposed to leave the child, a "planned time span" around when the child are supposed to say good-bye to the person to leave, and a "planned place (latitude and longitude information) around where the child are supposed to leave, and the like.

The "time span" is information set in such a manner as to have a width in time, like "18:30 to 18:45".

The CPU 11 refers the plan condition table SD, and determines whether or not the condition of the "activity plan" of the child is satisfied.

Figure 10:
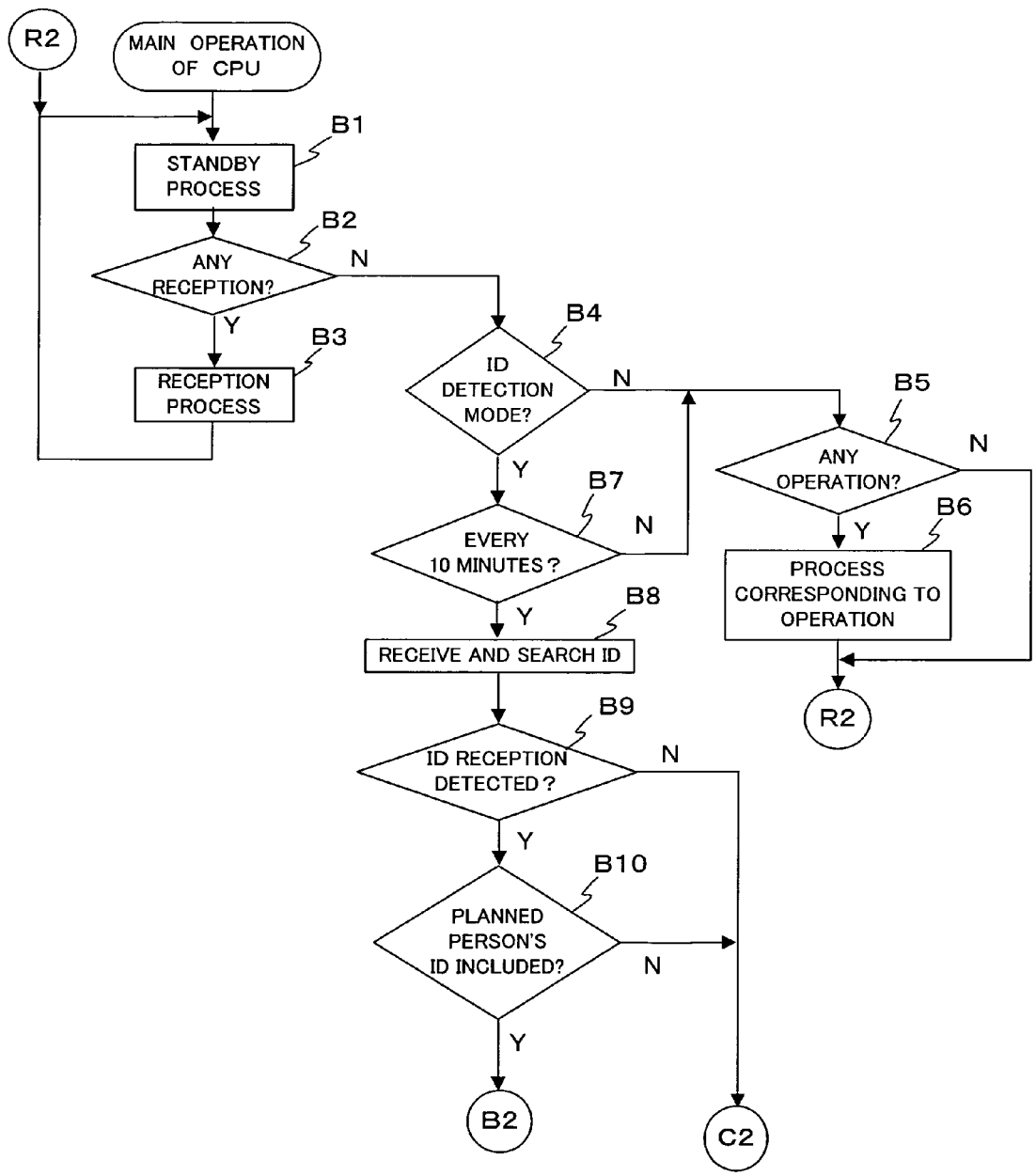
FIG. 10 is a flowchart showing the operation of the characteristic part of the second embodiment of the invention which is the main operation of a CPU in a cellular phone device of which execution is started in accordance with power activation.
Figure 11:
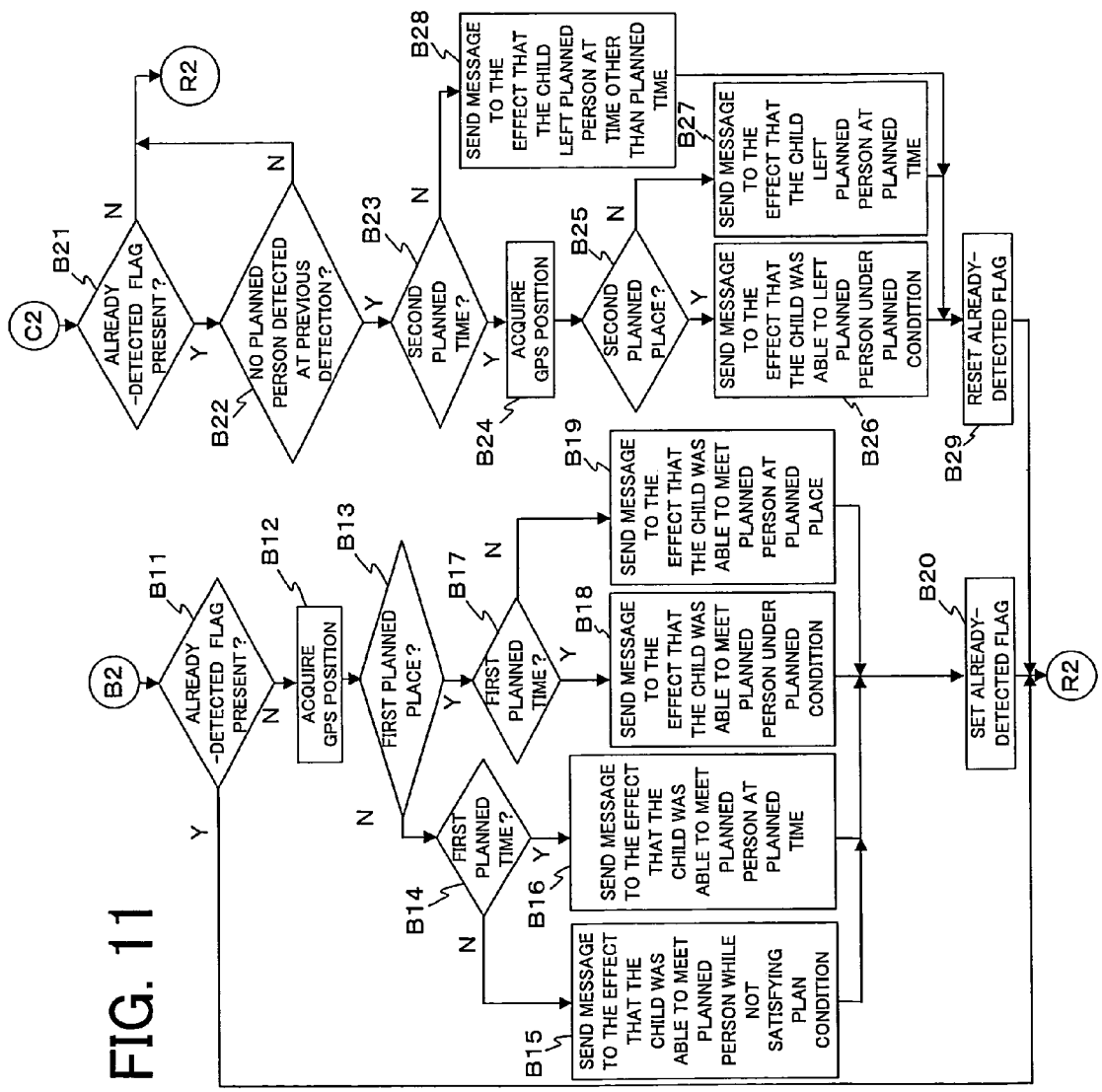
FIG. 11 is a flowchart continuous from FIG. 10.

FIGS. 10 and 11 are flowcharts showing the operation in accordance with the characteristic part of the second embodiment, and showing the entire operation of the cellular phone device of which execution is started after power activation.

First, the CPU 11 performs a standby process of causing the telephone communication unit 15 to register a current position (step B1 in FIG. 10). After the process at the step B1 is executed, the CPU 11 checks presence/absence of an incoming telephone/mail (step B2). When reception of an incoming telephone/mail is detected (step B2: YES), the CPU 11 performs incoming alert, and executes a reception process for an incoming telephone or an electronic mail (step B3). After the reception process is executed, the CPU 11 returns to the standby state.

On the other hand, when no telephone/mail reception is detected at the step B2, and the CPU 11 is in the standby state, the flow progresses to step B4. The CPU 11 determines whether or not the "ID detection mode" for detecting a neighborhood situation through the short-range wireless communication unit 24 is set (step B4). When the determination result is negative (step B4: NO), the CPU 11 determines whether or not any operation is performed (step B5).

When determining that any operation is performed, the CPU 11 executes an outgoing telephone process, a e-mail creation and transmission process, or the like as a process corresponding to a key operation (step B6). After the process at the step B6 is executed and after the determination result at the step B5 is negative, the CPU 11 returns to the standby state (step B1).

When the "ID detection mode" is set (step B4: YES), the CPU 11 checks whether or not a predetermined time elapsed from a previous detection (step B7). In the embodiment, a detection timing for detecting a neighborhood situation is set as every ten minutes. Therefore, according to the embodiment, when ten minutes elapsed from the previous detection, the determination result at the step B7 becomes positive, and the flow progresses to step B8. The CPU 11 accesses the short-range wireless communication unit 24, and searches the reception of a "communication-partner ID" (step B8). Subsequently, the CPU 11 determines whether or not an other cellular phone device 1 is present in the vicinity of the child's cellular phone device 1 through an automatic communication with the other cellular phone device 1 via the short-range wireless communication unit 24, i.e., whether or not communication-partner identification information (communication-partner ID) is received and acquired from an other cellular phone device 1 present in the vicinity of the child's cellular phone device 1 (step B9).

(When the "Communication-Partner ID" of a Person Supposed to Meet is Received and Acquired)

First, the explanation will be given of a case where one or a plurality of "communication-partner IDs" are received and acquired (a case where an other cellular phone device 1 is present in the vicinity of the child's cellular phone device 1). In this case, the determination result at the step B9 becomes positive, and the flow progresses to step B10. In the step B10, the CPU 11 searches the plan condition table SD based on received and acquired "communication-partner IDs", and checks whether or not the received and acquired "communication-partner IDs" include the "communication-partner ID" of a planned person set in the plan condition table SD (whether or not a person supposed to meet is present near the child).

(When the Child was Able to Meet the Person Supposed to Meet)

In a case where the received and acquired "communication-partner IDs" include the "communication-partner ID" set in the plan condition table SD (where the person supposed to meet is present near the child), that is, when the child was able to meet the person supposed to meet (step B10: YES), the flow progresses to step B11 in FIG. 11. The CPU 11 checks in the step B11 whether or not an "already-detected flag" is set.

The "already-detected flag" is set in a condition when the person supposed to meet is already detected (when the child was able to meet the person supposed to meet). At this point, the "already-detected flag" is not set yet, the determination result at the step B11 becomes negative, and the flow progresses to step B12. The CPU 11 acquires a current position from the GPS receiver 22 (step B12). Subsequently, the CPU 11 searches the plan condition table SD based on the current position, and checks whether or not the current position matches the "planned place" (hereinafter called "first planned place") in the first plan condition (step B13).

(When the Child was Able to Meet the Person Supposed to Meet at the Planned Place)

When the current position is the first planned place and the child was able to meet the person supposed to meet (step B13: YES), the CPU 11 acquires a current time from the RTC 23, searches the plan condition table SD, and checks whether or not the current time is included in the "planned time span" (hereinafter called "first planned time") in the first plan condition (step B17).

Let us suppose that the current time is included in the "first planned time" and the child was able to meet the person supposed to meet within the "planned time span" (step B17: YES). In this case, the flow progresses to step B18.

The CPU 11 creates a message (activity information) to the effect that the child met the person supposed to meet in accordance with the plan condition, refers the address book AD, and reads out the "mail address" of the person to which the "notification destination flag" is set. The CPU 11 then sends the e-mail including that message to the "mail address" (step B18).

The message can include a description such that "the child was able to meet the person A supposed to meet at 18:35 within the planned time span (18:30 to 18:45) around the ticket gate of a station XX which was a planned place".

Namely, the message includes the place where the child met the person supposed to meet, the current time acquired from the RTC 23, and the current position acquired from the GPS receiver 22. Note that place information based on the current position may be received and acquired through the Internet. After the process at the step B18 is executed, the CPU 11 sets the "already-detected flag" to indicate that the child met the person supposed to meet (or, the person supposed to meet was already detected) (step B20). After the process at the step B20 is executed, the CPU 11 returns to the standby state (step B1 in FIG. 10).

Meanwhile, according to the embodiment, in addition to the case where the child can meet the person supposed to meet in the "planned time span (first planned time)" at the "first planned place" (the case where the child meets the person supposed to meet while satisfying all conditions), in a case where the child met the person supposed to meet as a result even though some conditions are not satisfied, the CPU 11 creates a message (activity information) to that effect, and performs notification through an electronic mail.

(When the Place and the Time are not Planned Ones)

First, the explanation will be given of a case where the place that the child met the person supposed to meet is not the "first planned place", and the time when the child met that person is not the "planned time span".

In this case, the CPU 11 determines in the step B13 in FIG. 11 whether or not a current position matches the "first planned place" in the first plan condition. Because the place where the child met the person supposed to meet is not the "first planned place", the determination result becomes negative, and the flow progresses to step B14.

Like the process at the step B17, the CPU 11 checks whether or not the child was able to meet the person supposed to meet in the "planned time span" in the first plan condition (step B14). Because the time span when the child met is not the "planned time span", the determination result becomes negative, and the flow progresses to step B15. The CPU 11 creates a message to the effect that the child met the person supposed to meet without satisfying the plan condition, and sends a e-mail having a message to that effect to the foregoing "mail address" (step B15).

(When the Place where the Child Met the Person Supposed to Meet is not the Planned Place but the Time when the Child Met that Person is the Planned Time)

Next, the explanation will be given of the case where the place where the child met the person supposed to meet is not the "first planned place", but the time span when the child met that person is the "planned time span" (first planned time).

In this case, the CPU 11 determines in the step B13 in FIG. 11 whether or not a current position matches the "first planned place" in the first plan condition, but because the place where the child met that person is not the "planned place", the determination result becomes negative, and the flow progresses to step B14.

Like the process at the step B17, the CPU 11 checks whether or not the child was able to meet the person supposed to meet in the "planned time span (first planned time)" in the first plan condition (step B14). Because the time span when the child met that person is the "planned time span", the determination result becomes positive, and the flow progresses to step B16.

The CPU 11 creates a message to the effect that the child was able to meet the person supposed to meet in the "planned time span", and sends a e-mail including that message to the foregoing "mail address" (step B16).

(When the Place where the Child Met the Person Supposed to Meet is the Planned Place, but the Time when the Child Met that Person is not the Planned Time)

Next, the explanation will be given of the case where the place at which the child met the person supposed to meet is the planned place, but the time when the child met that person is not the planned time.

In this case, the CPU 11 determines in the step B13 in FIG. 11 whether or not a current position matches the "first planned place" in the first plan condition. Because the place where the child met the person supposed to meet is the planned place, the determination result becomes positive, and the flow progresses to step B17.

The CPU 11 checks whether or not the child met the person supposed to meet in the "planned time span (first planned time)" in the first plan condition (step B17). Because the time span when the child met the person supposed to meet is not the "planned time span (first planned time)", the determination result becomes negative, and the flow progresses to step B19.

The CPU 11 creates a message to the effect that the child was able to meet the person supposed to meet at the "planned place", and sends an electronic mail including that message to the foregoing "mail address" (step B19).

As described above, in a case where the child was able to meet the person supposed to meet as a result even though a partial condition is not satisfied, a message including a "current time" or a "current position" is created and notification through an electronic mail is executed (steps B15, B16, and B19). After the process at the steps B15, B16 and B19 are executed, the CPU 11 sets the "already-detected flag" to indicate that the child met the person supposed to meet (to indicate that the person supposed to meet was detected) (step B20). Thereafter, the CPU 11 returns to the standby state (step B1 in FIG. 10).

Meanwhile, let us suppose that after the child met the person supposed to meet, the child goes together with that person. In this case, when the determination result at the step B7 becomes positive every time ten minutes elapsed, reception and searching of a "communication-partner ID" is performed at the step B8 in FIG. 10, because the "communication-partner ID" of the person supposed to meet is detected, and the determination result at the step B9 becomes positive. Because the "communication-partner ID" of the person supposed to meet is included, the determination result at the step B10 becomes positive, and the flow progresses to the step B11. In the step B11, the CPU 11 determines whether or not the "already-detected flag" is set. At this time, because the "already-detected flag" is set, the determination result at the step B11 becomes positive, and the CPU 11 returns to the standby state (step B1 in FIG. 10). The foregoing operation is repeated in this manner every ten minutes while the child is being together with the person supposed to meet (accompanied person).

(When the "Communication-Partner ID" of the Person Supposed to Meet is not Received and Acquired)

Next, the explanation will be given of the case where the "communication-partner ID" of the person supposed to meet is not received and acquired. In this case, when the result of the determination in the step B7 in FIG. 10 whether or not ten minutes elapsed becomes positive, a "communication-partner ID" is searched in the step B8, and the CPU 11 determines in the step B9 whether or not a communication-partner ID is received and acquired. If there is no one around the child (if there is no other cellular phone device 1 around the child's cellular phone device 1), no "communication-partner ID" is received and acquired, and the determination result at the step B9 becomes negative, and the flow progresses to step B21 in FIG. 11. Even if a "communication-partner ID" is received and acquired and the determination result at the step B9 becomes positive, when the person allocated with that communication-partner ID is not the person supposed to meet, the determination result at the step B10 becomes negative, and the flow progresses to step B21 in FIG. 11.

In the step B21, the CPU 11 determines whether or not the "already-detected flag" is set. The "already-detected flag" is not set before the child meets the person supposed to meet, the determination result becomes negative, and the CPU 11 returns to the standby state (step B1 in FIG. 10).

(When the Child Leaves)

When the child leaves the person supposed to meet after the child met that person, the "already-detected flag" is kept being set, the determination result at the step B21 becomes positive, and the flow progresses to step B22. In the step B22, the CPU 11 determines whether or not there was no accompanied person around the child at a previous detection, i.e., whether or not the child is away from the accompanied person even after ten minutes elapsed.

When there was an accompanied person around the child at the previous detection but no accompanied person is detected at a present detection (step B22: NO), the CPU 11 determines that the child is temporarily away from the accompanied person, and returns to the standby state (step B1 in FIG. 10).

When no accompanied person around the child is detected at the previous and present detections (step B22: YES), the CPU 11 determines that the child left the accompanied person, and the flow progresses to step B23.

In the step B23, the CPU 11 acquires a current time from the RTC 23, searches the plan condition table SD based on the current time, and checks whether or not the current time is included in the "planned time span "(second planned time)" in the second plan condition. When the current time is included in the "planned time span" and when the CPU 11 determines that the child left the accompanied person (step B23: YES), the CPU 11 acquires a current position from the GPS receiver 22 (step B24). Subsequently, the CPU 11 searches the plan condition table SD based on the current position, and checks whether or not the current position matches the "planned place (second planned place)" in the second plan condition (step B25).

When the current position is included in the second planned place and when the child left the accompanied person at the second planned time (step B25: YES), the CPU 11 creates a message to the effect that the child left the accompanied person as planned. Subsequently, the CPU 11 reads out the "mail address" of a person to which the "notification destination flag" is set, from the address book AD. The CPU 11 sends a e-mail including the message to that effect to the "mail address" (step B26). The message includes information on the "current time" and the "current position" that the child left the accompanied person (planned person). After the process at the step B26 is executed, the CPU 11 resets the "already-detected flag" (step B29). After the process at the step B29 is executed, the CPU 11 returns to the standby state (step B1 in FIG. 10).

(When the Place where the Child Left the Accompanied Person is not the Planned Place, but the Time when the Child Left is the Planned Time)

Next, the explanation will be also given of the case where the child left the accompanied person is not the planned place (second planned place), but the time when the child left is the planned time (second planned time). In this case, the determination result at the step B23 becomes positive, and the flow shifts to the step B24. Further, a GPS position is acquired at the step B24, and because a current position is not the planned place, the determination result at the step B25 becomes negative, and the flow shifts to the step B27. The CPU 11 creates a message to the effect that the child left the accompanied person (planned person) within the "planned time span", and sends an e-mail including the message to that effect to the foregoing "mail address" (step B27). The message includes information on the "current time" when the child left the accompanied person.

(When the Time at which the Child Left the Accompanied Person is not the Planned Time)

Next, the explanation will be given of the case where the time when the child left is not the planned time (second planned time). In this case, the determination result at the step B23 becomes negative, and the flow progresses to the step B28. The CPU 11 creates a message to the effect that the child left the accompanied person in a time span other than the "planned time span", and sends a e-mail including the message to that effect to the foregoing "mail address" (step B28). Subsequently, the CPU 11 resets the "already-detected flag" (step B29). After the process at the step B29 is executed, the CPU 11 returns to the standby state (step B1 in FIG. 10).

As explained above, according to the second embodiment, the CPU 11 creates a message (activity information) indicating that the child acts in accordance with a plan based on the result of a detection through the short-range wireless communication unit 24 whether or not a predetermined partner is present in the vicinity of the child, and the result of a determination whether or not the plan condition set in the plan condition table SD is satisfied. Subsequently, the CPU 11 sends the notification message to the predetermined communication terminal 4 through the long-range wireless communication function via an electronic mail (step B18 in FIG. 11). This enables automatic notification of the activity information of a child or an elderly to another communication terminal 4. Therefore, the activity information can be remotely sent to a family away from the child or the elderly even though the child or the elderly unfamiliar with the operation does not do any particular operation. Therefore, the child or the elderly can be remotely detected.

Moreover, according to the embodiment, in a case where the child was able to meet the person supposed to meet, when either one of the "planned time span (first planned time)" or the "first planned place" is satisfied in the "planned time span (first planned time)" and the "first planned place" set in the plan condition table SD, the CPU 11 remotely notifies the communication terminal 4 of the satisfaction of the condition (steps B16, B19 in FIG. 11). Accordingly, because a notification to the effect that the child did not meet the person supposed to meet in the "planned time span (first planned time)" but met at the "first planned place", and a notification to the effect that the child did not meet that person at the "first planned place" but met in the "planned time span (first planned time)" can be transmitted, so that the family can come to know in what condition the child met the person supposed to meet.

Further, in a case where the child was able to meet the person supposed to meet but the place where the child met is not the first planned place and the time when the child met is not the first planned time, the CPU 11 performs remote notification of the meeting condition (step B15 in FIG. 11). This enables the family to come to know in what condition the child met the person supposed to meet.

Further, according to the embodiment, when the child left the accompanied person, the CPU 11 checks whether or not either one of the "planned time span (second planned time)" or the "second planned place" set in the plan condition table SD is satisfied (steps B23 and B25 in FIG. 11). The CPU 11 performs remote notification of the leaving of the child in that condition (steps B26, B27 and B28 in FIG. 11). That is, for example, when the child left the accompanied person in accordance with the plan, the CPU 11 performs notification to that effect, and when the time at which the child left the accompanied person is not the "planned time span (second planned time)", the CPU 11 performs notification to that effect, and when the place where the child left the accompanied person is not the "second planned place" but the time when the child left is the "planned time span (second planned time)", the CPU 11 performs notification to that effect. Therefore, the family can come to know in what condition the child or the like left the accompanied person.

Still further, according to the embodiment, when the "communication-partner IDs" of other cellular phone devices 1 are received and acquired from the other cellular phone devices 1 through the short-range wireless communication unit 24 and when the "communication-partner IDs" includes a "communication-partner ID" set in the plan condition table SD, the CPU 11 performs notification that the child or the like was able to meet the person supposed to meet (steps B10, B11, B15 to B19 in FIG. 10). This enables the parent or the like to come to know that fact instantaneously.

According to the embodiment, notification through an electronic mail is performed when the child was able to meet the person supposed to meet. After the child met that person, the "already-detected flag" is set, and notification through an electronic mail is not performed while the child is being together (being accompanied) with that person (step B11 in FIG. 11). Namely, notification by e-mail through an electronic mail is performed only when the child met the person supposed to meet at first, it is possible to avoid sending e-mails including the same contents redundantly.

According to the embodiment, based on whether or not the "communication-partner IDs" received and acquired through the short-range wireless communication unit 24 include a "communication-partner ID" set in the plan condition table SD, the CPU 11 performs notification of a change of the presence/absence of the corresponding person around the child (step B10 in FIG. 10, and steps B21 and B22 in FIG. 11). That is, at a time when the child was able to meet the person supposed to meet, the CPU 11 notifies the communication terminal 4 that the child was able to meet that person, and at a time when the child left the person (accompanied person), the CPU 11 notifies the communication terminal 4 that the child left that person.

According to the embodiment, when the child was able to meet the person supposed to meet, or when the child left that person, the CPU 11 creates a message including at least either one of a "current time" and a "current position", and sends an electronic mail including that message.

This allows the parent away from the child to specifically know the situation when the child met the person supposed to meet or the situation when the child left the accompanied person.

Like the first embodiment, when the "ID detection mode" is set, the CPU 11 detects a neighborhood situation through the short-range wireless communication unit 24, thereby reporting a neighborhood situation in accordance with necessity.

According to the second embodiment, when the child was able to meet the person supposed to meet, the CPU 11 determines whether or not the time when the child met is in the "planned time span", and whether or not the place where the child met is the "planned place". However, the CPU 11 may start determination whether or not the child was able to meet the person supposed to meet when the time becomes the "planned time span", and may start determination whether or not the child was able to meet that person when a current position becomes the "planned place".

In the same fashion, according to the second embodiment, when the child left the accompanied person, the CPU 11 determines whether or not the time when the child left is the "planned time span", and determines whether or not the place where the child left is the "planned place". However, the CPU 11 may start determination whether or not the child left the accompanied person when the time becomes the "planned time span", and when a current position becomes the "planned place".

According to the first embodiment, for example, the CPU 11 creates neighborhood information which is information indicating whether or not a person around the cellular phone device 1 is a person registered beforehand, and performs remote notification of that information to another communication terminal 4. Further, according to the second embodiment, the CPU 11 creates activity information which is information indicating a condition whether or not a person who possesses the cellular phone device 1 acts as planned, and performs remote notification of that information to another communication terminal 4. According to the second embodiment, the CPU 11 creates information indicating a condition whether or not the presence/absence of a predetermined communication terminal changes, and performs remote notification of the information. In this manner, by detecting whether or not another communication terminal is present in the vicinity of the cellular phone device 1 through the short-range communication unit, creating information on a neighborhood situation based on the detection result, and sending the information to another communication terminal 4 through the long-range communication unit, the recent event of a person possessing the cellular phone device 1 can be remotely sent to another person away from that person who possesses the cellular phone device 1 without the need that the possessor of the cellular phone device 1 should do any particular operation.

Communication-partner identification information is not limited to a "communication-partner ID", but may be a communication-partner's "name", "telephone number", or "mail address" itself. The short-range communication scheme may be the Bluetooth communication scheme, the ZigBee (registered trademark) having low power consumption, or the UWB (registered trademark) having a faster communication speed. In a word, any communication scheme can be employed as long as communication terminal devices can directly communicate with each other.

In a case where the cellular phone device 1 and another communication terminal 4 are the cellular phone devices which belong to the same cellular phone communication network, notification through an e-mail may be performed via the cellular phone communication network only, not through the Internet.

The present invention is not limited to a cellular phone device, and can be applied to a mobile terminal device, such as a PDA, an electronic camera, an electronic wrist watch, or a music reproducing device. Further, the cellular phone device of the embodiment may be a mobile terminal device only for embodying the foregoing functions, i.e., an purpose-built mobile terminal device.

The cellular phone device 1 of the first and second embodiments has one CPU 1, but may have a plurality of CPUs which embody the foregoing functions through cooperative operations.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2007-052210 filed on Mar. 2, 2007 and including specification, claims, drawings and summary. The disclosure of the above Japanese Patent Application is incorporated herein by reference in its entirety.

What is claimed is:

1. A mobile terminal device comprising:
   a short-range communication unit which performs direct short-range communication with another communication terminal present within a vicinity of an area in which radio waves arrive from the direct short-range communication;
   a long-range communication unit which performs long-range communication with a predetermined communication terminal through a network;
   a table in which communication-partner information is registered to identify a possessor of the another communication terminal;
   a detection unit which detects the another communication terminal by performing an automatic communication with another short-range communication unit of the another communication terminal using the short-range communication unit of the mobile terminal device;
   an acquisition unit which acquires communication-partner identification information from the another communication terminal through the short-range communication unit to identify that the possessor of the another communication terminal is registered when the detection unit detects that the another communication terminal is present within the vicinity of the mobile terminal device; and
   a notification unit which creates an e-mail containing neighborhood information relating to a partner who is the possessor of the another communication terminal based on the communication-partner identification information acquired by the acquisition unit and information registered in the table, and notifies the predetermined communication terminal of the created e-mail through the long-range communication unit.

2. The mobile terminal device according to claim 1, further comprising:
   a determination unit which determines whether the communication-partner identification information registered in the table beforehand is included in the acquired communication-partner identification information,
   wherein the notification unit notifies the predetermined communication terminal of neighborhood information indicating that a registered communication-partner is present in within the vicinity of the mobile terminal device when the determination unit determines that the registered communication-partner identification information is included in the acquired communication-partner identification information.

3. The mobile terminal device according to claim 1, further comprising:
   a determination unit which determines whether information other than the communication-partner identification information registered in the table beforehand is included in the acquired communication-partner identification information,
   wherein the notification unit notifies the predetermined communication terminal of neighborhood information indicating that an unknown communication partner, which is not a registered communication terminal, is present within the vicinity of the mobile terminal device when the determination unit determines that information other than the registered communication-partner identification information is included in the acquired communication-partner identification information.

4. The mobile terminal device according to claim 3, wherein the notification unit notifies the predetermined communication terminal of neighborhood information indicating that the unknown communication partner, which is not the registered communication terminal, is present within the vicinity of the mobile terminal device when the determination unit determines continuously for a predetermined time that the acquired communication-partner identification information is not communication-partner identification information registered in the table.

5. The mobile terminal device according to claim 1, wherein the notification unit starts notification when the detection unit detects that the another communication terminal is present within the vicinity of the mobile terminal device.

6. The mobile terminal device according to claim 1, further comprising:
   a recording unit which sequentially records communication-partner identification information acquired by the acquisition unit,
   wherein the notification unit reads out individual communication-partner identification information sequentially recorded at predetermined timings, and notifies a predetermined communication terminal of the read-out communication-partner identification information collectively.

7. The mobile terminal device according to claim 1, further comprising:
   a determination unit which determines whether the communication-partner identification information acquired by the acquisition unit is new communication-partner identification information,
   wherein the notification unit notifies the predetermined communication terminal of neighborhood information indicating that a new communication partner is present within the vicinity of the mobile terminal device when the determination unit determines that the acquired communication-partner identification information is new communication-partner identification information.

8. The mobile terminal device according to claim 1, further comprising:
   a determination unit which determines whether a detection result by the detection unit satisfies a plan condition registered in the table and including identification information of a person supposed to meet or leave the possessor, and
   wherein the notification unit creates activity information indicating an activity in accordance with a plan based on a detection result by the detection unit and a determination result by the determination unit, and notifies the predetermined communication terminal of the activity information through the long-range communication unit.

9. The mobile terminal device according to claim 8, wherein the plan condition includes at least one of a time span and a pre-designated place, and when the detection unit determines that an other communication terminal is present within the vicinity of the mobile terminal device under a circumstance satisfying the plan condition, the notification unit notifies a predetermined communication terminal of information to that effect.

10. The mobile terminal device according to claim 8, wherein the plan condition includes at least one of a time span and a pre-designated place, and when the detection unit determines that no other communication terminal is present within the vicinity of the mobile terminal device under a circumstance satisfying the plan condition, the notification unit notifies the predetermined communication terminal of information to that effect.

11. The mobile terminal device according to claim 8, further comprising:
   a determination unit which determines whether communication-partner identification information pre-registered in the table is included in the acquired communication-partner identification information,
   wherein the notification unit notifies the predetermined communication terminal of neighborhood information indicating that a registered communication partner is present within the vicinity of the mobile terminal device when the determination unit determines that the registered communication-partner identification information is included in the acquired communication-partner identification information.

12. The mobile terminal device according to claim 8, further comprising:
   a determination unit which determines whether the communication-partner identification information acquired by the acquisition unit is new communication-partner identification information,
   wherein the notification unit notifies the predetermined communication terminal of neighborhood information indicating that a new communication partner is present within the vicinity of the mobile terminal device when the determination unit determines that the acquired communication-partner identification information is new communication-partner identification information.

13. The mobile terminal device according to claim 1, further comprising:
   a determination unit which determines whether the another communication terminal detected by the detection unit is the predetermined communication terminal pre-registered in the table,
   wherein when the determination unit determines a change in presence/absence of the predetermined communication terminal, the notification unit notifies the predetermined communication terminal of that change through the long-range communication unit.

14. The mobile terminal device according to claim 13, wherein when the determination unit determines that a state indicating that the predetermined communication terminal is absent changes to a state indicating that the predetermined communication terminal is present, the notification unit notifies the predetermined communication terminal of that change.

15. The mobile terminal device according to claim 13, wherein when the determination unit determines that a state indicating that the predetermined communication terminal is present changes to a state indicating that the predetermined communication terminal is absent, the notification unit notifies the predetermined communication terminal of that change.

16. The mobile terminal device according to claim 1, further comprising:
   a time acquisition unit which acquires information on a current time; and
   a position acquisition unit which acquires information on a current position,
   wherein the notification unit notifies the predetermined communication terminal of time information acquired by the time acquisition unit and position information acquired by the position acquisition unit together with created information.

17. The mobile terminal device according to claim 1, further comprising:
a mode setting unit which sets a predetermined operation mode,
wherein when a predetermined operation mode is set by the mode setting unit, the detection unit detects whether the another communication terminal is present within the vicinity of the mobile terminal device.

18. A remote notification method comprising the steps of:
detecting whether a communication terminal is present within a vicinity of an area in which radio waves arrive through a direct short-range communication with another communication terminal;
acquiring communication-partner identification information from the another communication terminal through the direct short-range communication to identify that a possessor of the another communication terminal is registered upon detecting that the another communication terminal is present within the vicinity of communication terminal; and
creating an e-mail containing neighborhood information relating to a partner who is the possessor of the another communication terminal based on the acquired communication-partner identification information and information registered in a table, and notifying a predetermined communication terminal of the created e-mail through a long-range communication.

19. A non-transitory computer-readable recording medium encoded with a computer program executed by a mobile terminal that causes remote notification, the computer program comprising:
program code for performing a function of performing direct short-range communication with another communication terminal present within a vicinity of an area in which radio waves arrive from the direct short-range communication;
program code for performing a function of performing long-range communication with a predetermined communication terminal device through a network;
program code for performing a function of detecting the another communication terminal by performing an automatic communication through the direct short-range communication with the another communication terminal;
program code for performing a function of acquiring communication-partner identification information from the another communication terminal through the direct short-range communication to identify that a possessor of the another communication terminal is registered upon detecting that the another communication terminal is present within the vicinity of mobile terminal; and
program code for performing a function of creating an e-mail containing neighborhood information relating to a partner who is a possessor of the another communication terminal based on the acquired communication-partner identification information and information registered in a table, and of notifying the predetermined communication terminal of the created e-mail information through a long-range communication.

* * * * *